US010367659B2

(12) United States Patent
Lee et al.

(10) Patent No.: US 10,367,659 B2
(45) Date of Patent: Jul. 30, 2019

(54) APPARATUS AND METHOD FOR ESTIMATING DOWNLINK CHANNEL IN WIRELESS COMMUNICATION SYSTEM

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Keon-Kook Lee, Suwon-si (KR); Sun-Ho Park, Seoul (KR); Byonghyo Shim, Seoul (KR); Tae-Young Kim, Seongnam-si (KR); Ji-Yun Seol, Seongnam-si (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/570,647

(22) PCT Filed: Apr. 29, 2016

(86) PCT No.: PCT/KR2016/004541
§ 371 (c)(1),
(2) Date: Oct. 30, 2017

(87) PCT Pub. No.: WO2016/175609
PCT Pub. Date: Nov. 3, 2016

(65) Prior Publication Data
US 2018/0294997 A1 Oct. 11, 2018

(30) Foreign Application Priority Data
Apr. 30, 2015 (KR) .................. 10-2015-0062106

(51) Int. Cl.
*G01R 31/08* (2006.01)
*H04L 25/02* (2006.01)
(Continued)

(52) U.S. Cl.
CPC ......... *H04L 25/024* (2013.01); *H04B 7/0452* (2013.01); *H04L 25/0204* (2013.01);
(Continued)

(58) Field of Classification Search
USPC ............................................... 370/242, 252
See application file for complete search history.

(56) References Cited

U.S. PATENT DOCUMENTS 9,413,563 B2 * 8/2016 Patel .................. H04L 25/0224
2010/0128807 A1 5/2010 Hyung-Jin et al.
(Continued)

FOREIGN PATENT DOCUMENTS

KR 10-2010-0057439 A 5/2010
KR 10-2011-0057893 A 6/2011
(Continued)

OTHER PUBLICATIONS

Sunho Park et al., "Virtual Pilot Signal for Massive MIMO-OFDM Systems", pp. 1-5, Feb. 9, 2014.

*Primary Examiner* — Phuongchau Ba Nguyen
(74) *Attorney, Agent, or Firm* — Jefferson IP Law, LLP

(57) ABSTRACT

The present disclosure relates to a 5G or pre-5G communication system to be provided to support a higher data transmission rate beyond the 4G communication system, such as LTE. The present invention provides a method for estimating a downlink channel by a receiver in a wireless communication system, the method comprising: estimating the downlink channel on the basis of a reference signal to recover an information bit, and checking whether the information bit recovery has succeeded; and when the informa-
(Continued)

tion bit recovery has not succeeded, selecting at least one of the received signals as a virtual reference signal on the basis of the accuracy of the data reconstructed at a related resource location and the correlation between the related resource location and a resource location related to the reference signal, and estimating the downlink channel on the basis of at least one virtual reference signal.

14 Claims, 8 Drawing Sheets

(51) Int. Cl.
*H04L 25/03* (2006.01)
*H04B 7/0452* (2017.01)
*H04W 24/08* (2009.01)

(52) U.S. Cl.
CPC .... *H04L 25/0236* (2013.01); *H04L 25/03891* (2013.01); *H04W 24/08* (2013.01)

(56) References Cited

U.S. PATENT DOCUMENTS

2013/0034177 A1 2/2013 Lee et al.
2015/0103801 A1 4/2015 Nam et al.

FOREIGN PATENT DOCUMENTS

| KR | 10-2014-0037692 A | 3/2014 |
| KR | 10-1496382 B1 | 2/2015 |
| KR | 10-2015-0026949 A | 3/2015 |
| WO | 2014/161577 A1 | 10/2014 |

* cited by examiner

APPARATUS AND METHOD FOR ESTIMATING DOWNLINK CHANNEL IN WIRELESS COMMUNICATION SYSTEM

CROSS-REFERENCE TO RELATED APPLICATION(S)

The present application claims priority under 35 U.S.C. § 365 to International Patent Application No. PCT/KR2016/004541 filed on Apr. 29, 2016, entitled "APPARATUS AND METHOD FOR ESTIMATING DOWNLINK CHANNEL IN WIRELESS COMMUNICATION SYSTEM", and to Korean Patent Application No. 10-2015-0062106 filed on Apr. 30, 2015, which is incorporated herein by reference into the present disclosure as if fully set forth herein.

TECHNICAL FIELD

The present disclosure relates to an apparatus and method for estimating a downlink channel in a multi-user multiple input multiple output (MU-MIMO) system.

BACKGROUND ART

To satisfy the increasing demands for wireless data traffic since commercialization of $4^{th}$ generation (4G) communication systems, efforts have been made to develop an improved $5^{th}$ generation (5G) communication system or a pre-5G communication system. For this reason, the 5G or pre-5G communication system is referred to as a beyond-4G or post long term evolution (LTE) system.

To achieve high data rates, deployment of the 5G communication system in a millimeter wave (mmWave) band (for example, a 60-GHz band) is under consideration. For the 5G communication system, beamforming, massive multiple input multiple output (MIMO), full dimensional MIMO (FD-MIMO), array antenna, analog beamforming, and large-scale antenna techniques have been discussed in order to mitigate the path loss and propagation distance of waves in the mmWave band.

Further, for network improvement in the system, technologies such as evolved small cell, advanced small cell, cloud radio access network (RAN), ultra-dense network, device-to-device (D2D) communication, wireless backhaul, moving network, cooperative communication, coordinated multi-point (CoMP), and interference cancellation have been developed in the 5G system.

Besides, advanced coding modulation (ACM) techniques such as hybrid FSK and QAM modulation (FQAM) and sliding window superposition coding (SWSC), and advanced access techniques such as filter bank multi carrier (FBMC), non-orthogonal multiple access (NOMA), and sparse code multiple access (SCMA) have been developed in the 5G system.

In a multi-user MIMO (MU-MIMO) system, the same resources are allocated to a plurality of users, using downlink (DL) channel information, and beamforming is applied to the users to avoid interference between the users, thereby increasing a sum rate. If the channel information is accurate, beamforming prevents a signal of one user from interfering with a signal of another user, and thus even though a receiver is designed in the same manner as in a single input single output (SISO) system, reception performance may be increased. However, a channel estimation error and quantization-incurred information loss during transmission of DL channel information on an uplink (UL) make it very difficult to transmit accurate channel information to a transmitter. In this situation, beams formed based on inaccurate channel information leads to imperfect interference control, thereby degrading reception performance.

Reference signals (RSs) are transmitted in an orthogonal pattern in the MU-MIMO system. That is, an RS for one user and an RS for another user are the same signal transmitted with different codes in an orthogonal pattern. Ideally, a user may receive a signal without the influence of a signal of another user, using such an orthogonal pattern, and perform channel estimation. In most cases, however, a user has difficulty in fully reflecting a channel change which is attributed to a frequency change or occurs with passage of time during channel estimation, and thus in estimating accurate channel information. Further, since a received signal is processed on the assumption of perfect interference cancellation in the MU-MIMO system, inaccurate channel information causes the degradation of reception performance.

In the MU-MIMO system, the performance of a receiver depends on the accuracy of a beam formed by a transmitter. However, since the MU-MIMO system deals only with processing of a received signal on the assumption that interference from other users has been canceled by beamforming in the transmitter, it is vulnerable to interference from beams imperfectly formed due to quantization or a channel estimation error during transmission of channel information on a UL. Accordingly, a multi-user signal detection operation is needed to process the interference from the imperfect beams, but has a limited performance increase in view of imperfect channel estimation.

In this context, there is a need for a method for accurately estimating a DL channel in the MU-MIMO system.

The above data is presented as background data only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An aspect of the present disclosure is to provide an apparatus and method for estimating a downlink (DL) channel in a multi-user multiple input multiple output (MU-MIMO) system.

Another aspect of the present disclosure is to provide an apparatus and method for estimating a DL channel, using a virtual reference signal (RS) in an MU-MIMO system.

Another aspect of the present disclosure is to provide an apparatus and method for estimating a DL channel, using a virtual RS selected based on the accuracy of reconstructed data and a correlation between a received signal and an RS in an MU-MIMO system.

Another aspect of the present disclosure is to provide an apparatus and method for estimating a DL channel, using a virtual RS selected based on an average error of channels in an MU-MIMO system.

Technical Solution

In an aspect of the present disclosure, a method for estimating a downlink channel by a receiver in a wireless communication system includes recovering information bits by estimating a downlink channel based on a reference signal among received signals, if the recovery of information bits is failed, selecting a virtual reference signal based on at least one of accuracy of data recovered at a position of a resource carrying each of the received signals, a correlation between the position of the resource carrying each of the received signals and a position of a resource carrying the reference signal, and an average error of a channel estimated at the position of the resource carrying each of the received signals, and estimating the downlink channel based on the selected virtual reference signal.

In another aspect of the present disclosure, a receiver for estimating a downlink channel in a wireless communication system includes a decoder for recovering information bits by estimating a downlink channel based on a reference signal among received signals, and a channel estimator for, if the recovery of information bits is failed, selecting a virtual reference signal based on at least one of accuracy of data recovered at a position of a resource carrying each of the received signals, a correlation between the position of the resource carrying each of the received signals and a position of a resource carrying the reference signal, and an average error of a channel estimated at the position of the resource carrying each of the received signals, and estimating the downlink channel based on the selected virtual reference signal.

Other aspects, benefits, and core features of the present disclosure are processed in conjunction with the attached drawings, and will be apparent to those skilled in the art from the following detailed description of preferred embodiments of the present disclosure.

Before the following detailed description of the present disclosure is processed, it may be effective to define specific terms and phrases used in the present disclosure: the terms "include", "comprise", and their derivatives mean limitless inclusion; the term "or" is comprehensive and means 'and/or'; the phrases "associated with", "associated therewith", and their derivatives mean include, be included with, interconnect with, contain, be contained within, connected to or with, couple to or with, be communicable with, cooperate with, interleave, juxtapose, be proximate to, be bound to or with, have, have a property of, and so on; the term "controller" means any device, system, or a part thereof for controlling at least one operation, such a device being implementable in hardware firmware, software, or a combination of at least two of hardware, firmware, and software. It is to be noted that functionalities related to a specific controller may be concentrated or distributed, and local or remote. The definitions of the specific terms and phrases are provided throughput the present disclosure. Those skilled in the art should understand that in many cases, although not in most cases, the above definitions are applied to the future use of the defined terms and phrases as well as the conventional use thereof.

Advantageous Effects

According to the present disclosure, as a receiver generates a virtual RS by detecting multi-user signals and performs channel estimation based on the virtual RS in an MU-MIMO system, the performance of the receiver is increased through an iterative detection scheme.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

It is to be noted that similar reference numerals are used to denote the same or similar elements, features, and structures throughout the drawings.

BEST MODE FOR CARRYING OUT THE INVENTION

Embodiments of the present disclosure will be described in detail with reference to the attached drawings. Only a part required to understand operations according to the embodiments of the present disclosure will be described below, and a description of the other parts will be avoided lest it should obscure the subject matter of the present disclosure. Although terms as described below are defined in consideration of functions in the present disclosure, the terms may be changed according to the intention of a user or an operator, or customs. Therefore, the present disclosure should be understood, not simply by the actual terms used but by the meanings of each term lying within.

The present disclosure may be subjected to various modifications and have various embodiments. Specific embodiments of the present disclosure are described with reference to the accompanying drawings. However, the embodiments are not intended to limit the present disclosure, and it is to be understood that the present disclosure covers various modifications, equivalents, and/or alternatives to the embodiments.

Unless otherwise specified in the context, singular expressions such as "a" and "the" may include plural referents. For example, a "component surface" covers one or more component expressions.

Ordinal terms such as first or second may be used to describe, not limiting, various components. These expressions are used to distinguish one component from another component. For example, a first component may be referred to as a second component, and vice versa without departing from the scope of the present disclosure. The term and/or includes one or a combination of two or more of a plurality of enumerated items.

The terms as used in the present disclosure are provided to describe merely specific embodiments, not intended to limit the scope of other embodiments. It is to be understood that singular forms include plural referents unless the context clearly dictates otherwise. In the present disclosure, the term "include" or "have" signifies the presence of a specific feature, number, step, operation, component, part, or a combination thereof, not excluding the presence of one or more other features, numbers, steps, operations, components, parts, or a combination thereof.

Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Figure 1:
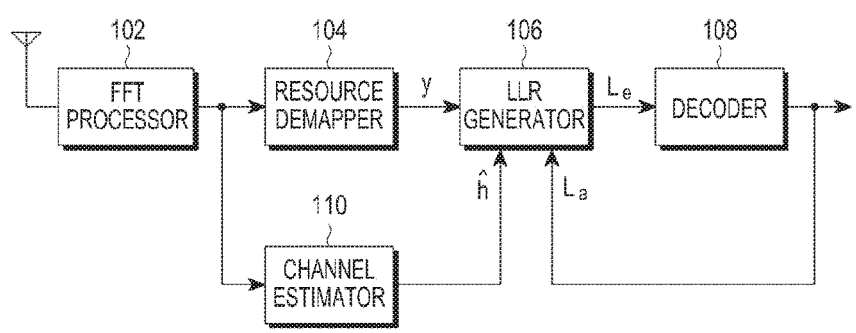
FIG. 1 is a block diagram of a receiver for estimating a downlink (DL) channel in a general multi-user multiple input multiple output (MU-MIMO) system.

FIG. 1 is a block diagram of a receiver for estimating a downlink (DL) channel in a multi-user multiple input multiple output (MU-MIMO) system.

Referring to FIG. 1, the receiver includes a fast Fourier transform (FFT) processor 102, a resource demapper 104, a log likelihood ratio (LLR) generator 106, a decoder 108, and a channel estimator 110.

In the MU-MIMO system, a transmitter has $N_t$ antennas, whereas a receiver has a single antenna. The FFT processor 102 receives a signal through a single antenna, and outputs an FFT signal to the resource demapper 104 and the channel estimator 110.

The resource demapper 104 detects a received signal y mapped to a related resource region in the input received signal, and provides the detected received signal y to the LLR generator 106. While not shown, the resource demapper 104 may include a physical resource demapper and a logical resource demapper. The physical resource demapper detects a received signal mapped to a physical resource region in the input received signal, and the logical resource demapper detects a received signal mapped to a logical resource region in the input received signal.

The LLR generator 106 calculates LLR values $L_e$ of symbols to be recovered from the detected received signal y, and provides the calculated LLR values $L_e$ to the decoder 108. The decoder 108 recovers information bits by performing channel decoding at a coding rate used in an encoder of a transmitter based on the calculated LLR values $L_e$. Further, a signal output from the decoder 108 is provided to the LLR generator 106, as prior probability information $L_a$ for iterative decoding.

Meanwhile, the channel estimator 110 estimates a DL channel based on the input received signal, and provides an estimated channel value ĥ to the LLR generator 106.

In the MU-MIMO system, a signal $y_i$ received at a specific $i^{th}$ user may be expressed as [Equation 1].

$$y_i = \sqrt{\rho} h_i w_i s_i + \sqrt{\rho} h_i \sum_{j=0, j \neq i}^{N_t - 1} w_j s_j + n_i \quad \text{[Equation 1]}$$

In [Equation 1], ρ represents the power of a transmission signal, $h_i$ represents a channel for the $i^{th}$ user, $w_i$ represents a precoding vector for the $i^{th}$ user, $s_i$ represents a symbol for the $i^{th}$ user, $w_j$ represents a precoding vector for a $j^{th}$ user, $s_j$ represents a symbol for the $j^{th}$ user, and $n_i$ represents Gaussian noise for the $i^{th}$ user.

On the assumption of beams formed based on accurate channel information, the product between the channel $h_i$ of the $i^{th}$ user and the precoding vector of the j user is 0, that is, $h_i w_j = 0$. Thus, the $i^{th}$ user receives a signal from which interference from the $j^{th}$ user has been canceled and in which only Gaussian noise remains. For this perfect interference cancellation, the transmitter should have knowledge of accurate channel information of all users.

However, since an estimation error generated during channel estimation at the receiver and quantization-incurred information loss during feedback of channel information to the transmitter are inevitable, it is not easy for the transmitter to have knowledge of accurate channel information of all users, making it difficult to perfectly cancel interference signals from other users in a received signal.

Figure 2:
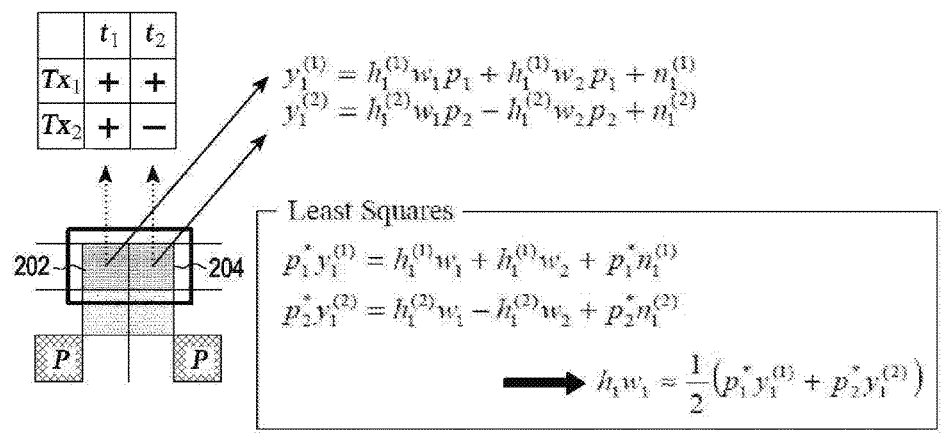
FIG. 2 is a view illustrating exemplary DL channel estimation in the general MU-MIMO system.

FIG. 2 illustrates an example of estimating a DL channel in the general MU-MIMO system.

FIG. 2 is based on the assumption that two users are allocated to two resource elements and receive reference signals (RSs) in the allocated elements. In this case, a signal received by a first user may be expressed as [Equation 2]. $y_1^{(1)}$ represents a signal received in a resource element 202, and $y_1^{(2)}$ represents a signal received in a resource element 204.

$$y_1^{(1)} = \sqrt{\rho} h_1^{(1)} w_1 p_1 + \sqrt{\rho} h_1^{(1)} w_2 p_1 + n_1^{(1)}$$

$$y_1^{(2)} = \sqrt{\rho} h_1^{(2)} w_1 p_2 - \sqrt{\rho} h_1^{(2)} w_2 p_2 + n_1^{(2)} \quad \text{[Equation 2]}$$

In [Equation 2], ρ represents the power of a transmission signal, $h_1$ represents a channel for the first user, $w_1$ represents a precoding vector for the first user, $p_1$ represents an RS allocated to a first resource element, $w_2$ represents a precoding vector for a second user, $p_2$ represents an RS allocated to a second resource element, and $n_1$ represents Gaussian noise for the first user. As noted from [Equation 2], RSs transmitted to two users are the same signal transmitted with different codes.

Channel estimation based on the signal received by the first user may be expressed as [Equation 3]. $p_2^* y_1^{(1)}$ represents channel estimation based on the signal received in the resource element 202, and $p_2^* y_1^{(2)}$ represents channel estimation based on the signal received in the resource element 204.

$$p_1^* y_1^{(1)} = \sqrt{\rho} h_1^{(1)} w_1 + \sqrt{\rho} h_1^{(1)} w_2 + p_1^* n_1^{(1)}$$

$$p_2^* y_1^{(2)} = \sqrt{\rho} h_1^{(2)} w_1 - \sqrt{\rho} h_1^{(2)} w_2 + p_2^* n_1^{(2)} \quad \text{[Equation 3]}$$

In [Equation 3], ρ represents the power of the transmission signal, $h_1$ represents the channel for the first user, $w_1$ represents the precoding vector for the first user, $p_1$ represents the RS allocated to the first resource element, $w_2$ represents the precoding vector for the second user, $p_2$ represents the RS allocated to the second resource element, and $n_1$ represents Gaussian noise for the first user.

If it is assumed that the channel of the first user is not changed at the positions of the RSs, the RSs of the first user may be represented as [Equation 4].

$$\sqrt{\rho} h_1 w_1 \approx \frac{1}{2}(p_1^* y_1^{(1)} + p_2^* y_1^{(2)}) \quad \text{[Equation 4]}$$

In [Equation 4], $\rho$ represents the power of the transmission signal, $h_1$ represents the channel for the first user, $w_1$ represents the precoding vector for the first user, $p_1$ represents the RS allocated to the first resource element, $p_2$ represents the RS allocated to the second resource element, and $y_1$ represents the received signal of the first user.

Figure 3:
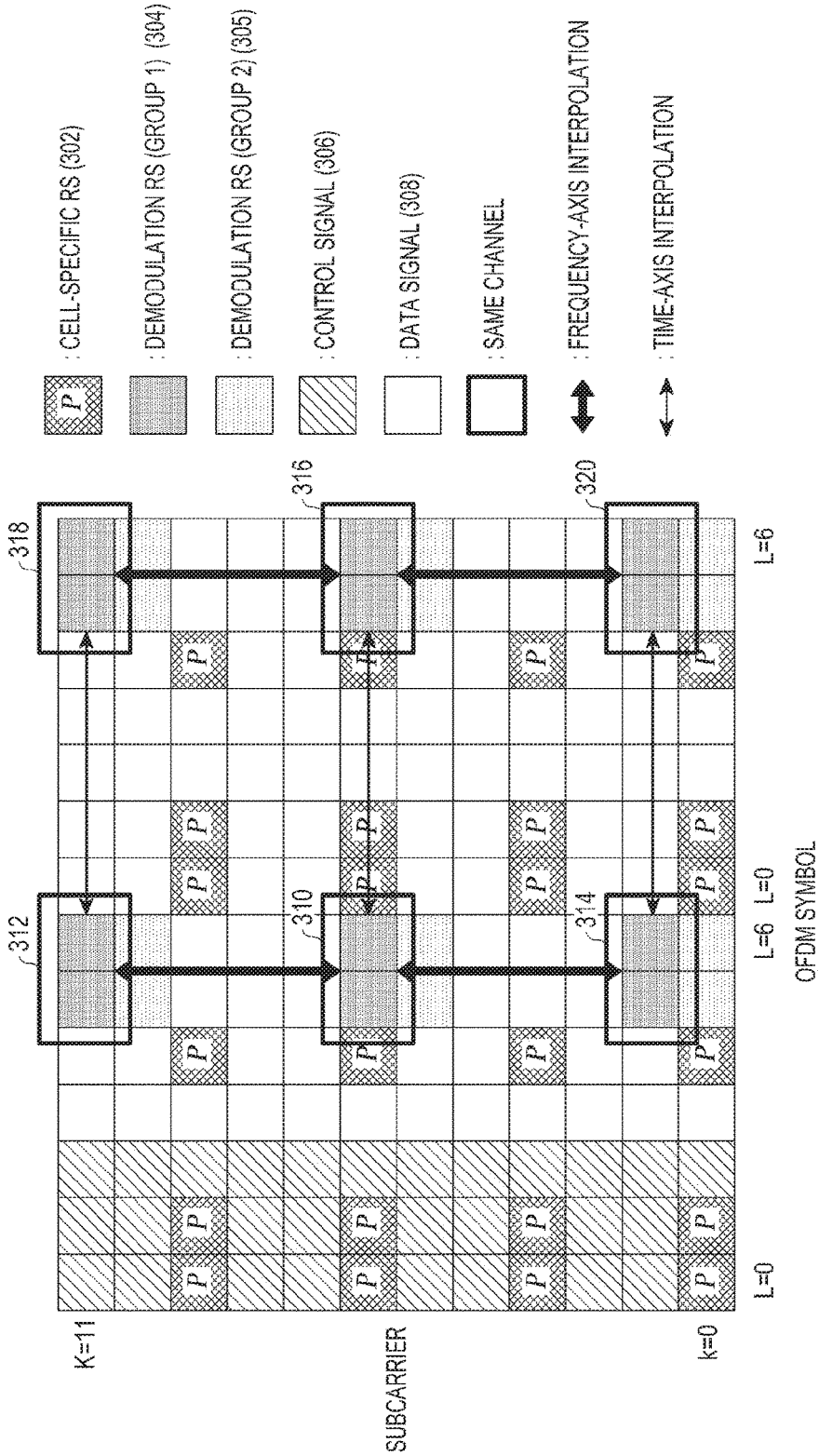
FIG. 3 is a view illustrating the positions of reference signals (RSs) and the positions of data signals in resource blocks in the general MU-MIMO system.

FIG. 3 is a view illustrating the positions of RSs and the positions of data signals in resource blocks in the general MU-MIMO system.

Referring to FIG. 3, two resource blocks are shown, and it is assumed that each of the resource blocks includes a plurality of resource elements.

Each resource block includes 7 orthogonal frequency division multiplexing (OFDM) symbols along the horizontal axis by 12 subcarriers along the vertical axis, and each resource element carries one of a cell-specific RS 302, a first demodulation RS 304, a second demodulation RS 305, a control signal 306, and a data signal 308. FIG. 3 is based on the assumption that four antennas are grouped into two groups each including two antennas. Therefore, the first demodulation RS 304 means a first demodulation RS group, and the second demodulation RS 305 means a second demodulation RS group.

A DL channel is estimated based on the first and second demodulation RSs 304 and 305, and channel estimation based on the first demodulation RS 304 will be described below as an example.

A receiver estimates a channel based on the first demodulation RS 304 received at a first position 310, and estimates channel information at second, third, and fourth positions 312, 314, and 316 using the channel information estimated at the first position 310. That is, the receiver estimates the channel information at the second and third positions 312 and 314 by applying interpolation or linear interpolation to the channel information estimated at the first position 310 along the frequency axis, and estimates the channel information at the fourth position 316 by applying interpolation or linear interpolation to the channel information estimated at the first position 310 along the time axis.

Further, the receiver estimates channel information at a fifth position 318 by applying interpolation or linear interpolation to the estimated channel information at the second position 312 along the time axis. In another method, the receiver estimates the channel information at the fifth position 318 by applying interpolation or linear interpolation to the estimated channel information at the fourth position 316 along the frequency axis.

Further, the receiver estimates channel information at a sixth position 320 by applying interpolation or linear interpolation to the estimated channel information at the third position 314 along the time axis. In another method, the receiver estimates the channel information at the sixth position 320 by applying interpolation or linear interpolation to the estimated channel information at the fourth position 316 along the frequency axis.

While not described with reference to FIG. 3, channel estimation based on the second demodulation RS 305 may also be performed in the same manner as channel estimation based on the first demodulation RS 304. That is, a channel may be estimated based on the second demodulation RS 305 received at a specific position, and channel information for the second demodulation RS 305 at a different position may be estimated using the channel information estimated at the measurement position.

Meanwhile, the receiver calculates the LLR values of a data signal based on the estimated channel information, and recovers information bits by performing channel decoding through a decoder. If the receiver fails in recovering the information bits, the receiver re-estimates a channel using an output value of the decoder. Herein, the channel re-estimation may be repeated until the information bits are successfully recovered, or a decoding repetition number may be predetermined and the channel estimation may be repeated as many times as the predetermined decoding repetition number.

Figure 4:
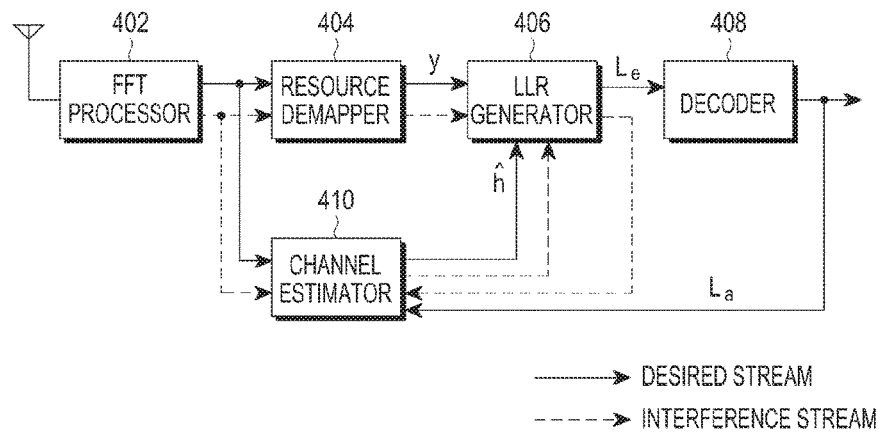
FIG. 4 is a block diagram of a receiver for estimating a DL channel in an MU-MIMO system according to an embodiment of the present disclosure.

FIG. 4 is a block diagram of a receiver for estimating a DL channel in an MU-MIMO system according to an embodiment of the present disclosure.

Referring to FIG. 4, the receiver includes an FFT processor 402, a resource demapper 404, an LLR generator 406, a decoder 408, and a channel estimator 410.

In the MU-MIMO system, a transmitter has $N_t$ antennas, whereas a receiver has a single antenna. The FFT processor 402 receives a signal through a single antenna, and outputs an FFT signal to the resource demapper 404 and the channel estimator 410.

The resource demapper 404 detects a received signal y mapped to a related resource region in the input received signal, and provides the detected received signal y to the LLR generator 406. Herein, it is assumed that the received signal mapped to the related resource region is an RS. While not shown, the resource demapper 404 may include a physical resource demapper and a logical resource demapper. The physical resource demapper detects a received signal mapped to a physical resource region in the input received signal, and the logical resource demapper detects a received signal mapped to a logical resource region in the input received signal.

The LLR generator 406 calculates LLR values $L_e$ of symbols to be recovered from the detected received signal y, and provides the calculated LLR values $L_e$ to the decoder 408. The LLR values $L_e$ provided to the decoder 408 are calculated by [Equation 5].

$$L = \ln\frac{Pr(b_1^{(i+)} \mid y_1^{(i)})}{Pr(b_1^{(i-)} \mid y_1^{(i)})} = \underbrace{\ln\frac{Pr(b_1^{(i+1)})}{Pr(b_1^{(i-)})}}_{L_a} + \underbrace{\ln\frac{\sum_{b_1^{(i+)}} Pr(y_1^{(i)} \mid d_1^{(i+)})Pr(b_1^{(i)})}{\sum_{b_1^{(i-)}} Pr(y_1^{(i)} \mid d_1^{(i-1)})Pr(b_1^{(i)})}}_{L_e}$$

[Equation 5]

In [Equation 5], $L_a$ represents an LLR value generated by the decoder in a previous channel estimation operation, $b_1^{(i+)}$ represents a case in which the logical value of an $i^{th}$ information bit among information bits for a first user is 1, $b_1^{(i-)}$ represents a case in which the logical value of the $i^{th}$ information bit among the information bits for the first user is 0, $d_1^{(i+)}$ represents a data signal in the case of $b_1^{(i+)}$, $d_1^{(i-)}$ represents a data signal in the case of $b_1^{(i-)}$, and $b_1^{(i)}$ represents the remaining information bits except for the $i^{th}$ information bit.

The decoder 408 recovers information bits by performing channel decoding in a decoding scheme corresponding to an encoding scheme used in an encoder of a transmitter based on the calculated LLR values $L_e$. Further, the decoder 408 provides the LLR values $L_a$ generated during channel estimation to the channel estimator 410.

Meanwhile, the channel estimator 410 estimates a DL channel based on the input received signal and provides an estimated channel value ĥ to the LLR generator 406. Herein, the channel estimator selects and generates a virtual RS using the output of the decoder 408, and then performs channel re-estimation based on the virtual RS, thereby achieving more accurate channel information.

In addition, the LLR generator 406 also estimates a data signal channel received from another user and calculates the LLR value of the data signal in order to process an interference signal received from the user. Herein, the interference signal may be, for example, an interference stream, and the data signal may be, for example, a desired stream. However, since it is very difficult to decode the data signal of another user, a virtual RS for the user used during channel re-estimation is generated from the calculated LLR value.

Figure 5:
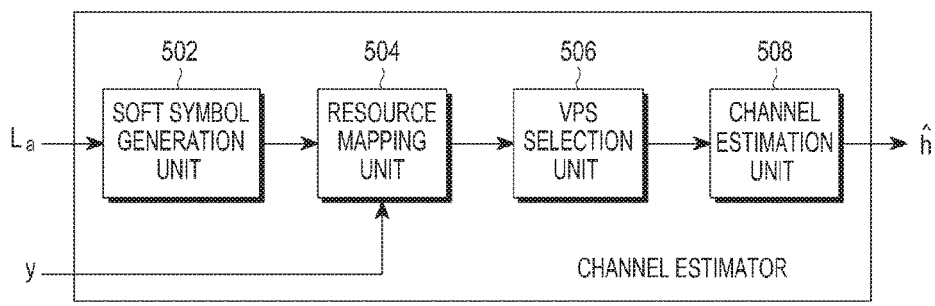
FIG. 5 is a block diagram of a channel estimator for estimating a DL channel in the MU-MIMO system according to an embodiment of the present disclosure.

With reference to FIG. 5, the operation of the channel estimator 410 illustrated in FIG. 4 will be described in detail.

FIG. 5 is a block diagram of a channel estimator for estimating a DL channel in the MU-MIMO system according to an embodiment of the present disclosure.

Referring to FIG. 5, the channel estimator includes a soft symbol generation unit 502, a resource mapping unit 504, a virtual pilot signal (VPS) selection unit 506, and a channel estimation unit 508.

An LLR value, $L_a$ generated from the decoder is input to the soft symbol generation unit 502, and the soft symbol generation unit 502 generates a soft symbol based on the LLR value $L_a$ by [Equation 6].

$$\overline{d}_1^{(i)} = E[d_1^{(i)}] = \sum_{\theta \in \Theta} \theta \prod_{m=1}^{Q} Pr(b_1^{(i,m)}) = \sum_{\theta \in \Theta} \theta \prod_{m=1}^{Q} \frac{1}{2}\left(1 + b_1^{(i,m)}\tanh\left(\frac{1}{2}L_a(b_1^{(i,m)})\right)\right)$$ [Equation 6]

In [Equation 6], θ represents one of symbols in a symbol set Θ, and Q represents the number of information bits in one symbol.

If quadrature phase shift keying (QPSK) is used as a modulation scheme, [Equation 7] may be calculated at a second moment.

$$\lambda_1^{(i)} = E[|d_1^{(i)}|^2] = \sum_{\theta \in \Theta} |\theta|^2 \prod_{m=1}^{Q} Pr(b_1^{(i,m)}) = \sum_{\theta \in \Theta} |\theta|^2 \prod_{m=1}^{Q} \frac{1}{2}\left(1 + b_1^{(i,m)}\tanh\left(\frac{1}{2}L_a(b_1^{(i,m)})\right)\right)$$ [Equation 7]

In [Equation 7], θ represents one of symbols in the symbol set Θ, and Q represents the number of information bits in one symbol.

The resource mapping unit 504 receives the received signal y and soft symbols output from the soft symbol generation unit 502, re-orders the values of the received soft symbols, and provides the re-ordered values of the soft symbols to the VPS selection unit 506. The VPS selection unit 506 selects a virtual RS in consideration of the accuracy of data recovered at resource positions at which DL signals are received respectively, and the correlations between the resource positions and the position of a resource carrying an RS. That is, the VPS selection unit 506 selects, as a virtual RS, a signal which has a high accuracy of recovered data and has been received at a resource position having a highest correlation, and provides the selected virtual RS to the channel estimation unit 508. The accuracy of recovered data and the correlations may be calculated by later-described [Equation 18].

The channel estimation unit 508 performs channel re-estimation based on the virtual RS received from the VPS selection unit 506.

Figure 6:
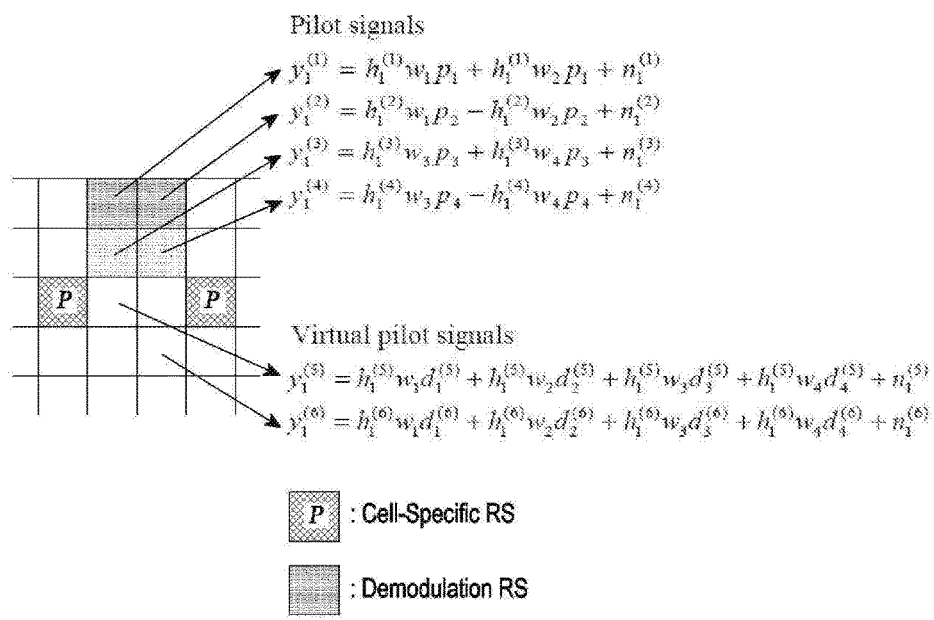
FIG. 6 is a view illustrating the positions of RSs and the positions of virtual RSs in a resource block in the MU-MIMO system according to an embodiment of the present disclosure.

FIG. 6 is a view illustrating the positions of RSs and the positions of virtual RSs in a resource block in the MU-MIMO system according to an embodiment of the present disclosure.

Referring to FIG. 6, it is assumed that the MU-MIMO system includes an evolved Node B (eNB) having four antennas and four users, and the four antennas are grouped into two groups each including two antennas. It is also assumed that the four users are allocated to four resources and receive RSs in the allocated resources.

In this case, a received signal $y_1$ of a first user may be vectorized as [Equation 8].

$$\begin{bmatrix} y_1^{(1)} \\ y_1^{(2)} \\ y_1^{(3)} \\ y_1^{(4)} \\ y_1^{(5)} \\ y_1^{(6)} \end{bmatrix} \approx \begin{bmatrix} p_1 & p_1 & 0 & 0 & 0 & 0 & 0 & 0 & 0 & 0 & 0 & 0 \\ p_2 & -p_2 & 0 & 0 & 0 & 0 & 0 & 0 & 0 & 0 & 0 & 0 \\ 0 & 0 & p_3 & p_3 & 0 & 0 & 0 & 0 & 0 & 0 & 0 & 0 \\ 0 & 0 & p_4 & -p_4 & 0 & 0 & 0 & 0 & 0 & 0 & 0 & 0 \\ 0 & 0 & 0 & 0 & d_1^{(5)} & d_2^{(5)} & d_3^{(5)} & d_4^{(5)} & 0 & 0 & 0 & 0 \\ 0 & 0 & 0 & 0 & 0 & 0 & 0 & 0 & d_1^{(6)} & d_2^{(6)} & d_3^{(6)} & d_4^{(6)} \end{bmatrix} \begin{bmatrix} \sqrt{\rho}\, h_1^{(1)} w_1 \\ \sqrt{\rho}\, h_1^{(1)} w_2 \\ \sqrt{\rho}\, h_1^{(3)} w_3 \\ \sqrt{\rho}\, h_1^{(3)} w_4 \\ \sqrt{\rho}\, h_1^{(5)} w_1 \\ \sqrt{\rho}\, h_1^{(5)} w_2 \\ \sqrt{\rho}\, h_1^{(5)} w_3 \\ \sqrt{\rho}\, h_1^{(5)} w_4 \\ \sqrt{\rho}\, h_1^{(6)} w_1 \\ \sqrt{\rho}\, h_1^{(6)} w_2 \\ \sqrt{\rho}\, h_1^{(6)} w_3 \\ \sqrt{\rho}\, h_1^{(6)} w_4 \end{bmatrix} + \begin{bmatrix} n_1^{(1)} \\ n_1^{(2)} \\ n_1^{(3)} \\ n_1^{(4)} \\ n_1^{(5)} \\ n_1^{(6)} \end{bmatrix} \quad \text{[Equation 8]}$$

In [Equation 8], $p_1$ represents an RS allocated to a first resource, $p_2$ represents an RS allocated to a second resource, $p_3$ represents an RS allocated to a third resource, $p_4$ represents an RS allocated to a fourth resource, $d_1$ represents a data signal for a first user, $d_2$ represents a data signal for a second user, $d_3$ represents a data signal for a third user, $d_4$ represents a data signal for a fourth user, $w_1$ represents a precoding vector for the first user, $w_2$ represents a precoding vector for the second user, $w_3$ represents a precoding vector for the third user, $w_4$ represents a precoding vector for the fourth user, $n_1$ represents Gaussian noise for the first user, $n_2$ represents Gaussian noise for the second user, $n_3$ represents Gaussian noise for the third user, and $n_4$ represents Gaussian noise for the fourth user.

Channel estimation based on the received signal of the first user may be given as [Equation 9]. $p_1^* y_1^{(1)}$ represents channel estimation based on a signal received in the resource element 202 illustrated in FIG. 2, and $p_2^* y_1^{(2)}$ represents channel estimation based on a signal received in the resource element 204 illustrated in FIG. 2.

$$y = P\tilde{h} + n \quad \text{[Equation 9]}$$
$$\hat{h} = \text{Cov}(\tilde{h}, y)\text{Cov}(y, y)^{-1} y$$
$$= (C_{\tilde{h},\tilde{h}} P^H)(PC_{\tilde{h},\tilde{h}} P^H + PP^H)^{-1} y$$

In [Equation 9], y represents a signal output from the resource demapper 404 of FIG. 4, $\tilde{h}$ represents a signal output from the channel estimator 410 of FIG. 4, and $C_{\tilde{h},\tilde{h}} = \text{Cov}(\tilde{h},\tilde{h})$.

In spite of the advantage of channel estimation of a plurality of users at one time, the channel estimation according to an embodiment of the present disclosure may be difficult to implement because an increase in the number of virtual RSs leads to an exponential increase in the computation complexity of an inverse matrix for channel estimation.

Therefore, to reduce the computation complexity, a method for estimating a channel after preliminarily removing an orthogonal pattern from RSs is used according to an embodiment of the present disclosure. If two users perform channel estimation using an RS group including two RSs in two resource elements, a received signal $\tilde{y}_1^{(1)}$ free of an orthogonal pattern may be represented as [Equation 10].

$$\tilde{y}_1^{(1)} = \frac{1}{2} [p_1^* \ p_2^*] \begin{bmatrix} y_1^{(1)} \\ y_1^{(2)} \end{bmatrix} = \sqrt{\rho}\, h_1^{(1)} w_1 + \frac{1}{2} p_1^* n_1^{(1)} + \frac{1}{2} p_2^* n_1^{(2)} \quad \text{[Equation 10]}$$

In [Equation 10], $p_1$ represents an RS allocated to the first resource, $p_2$ represents an RS allocated to the second resource, $y_1$ represents a received signal of the first user, $\rho$ represents the power of a transmission signal, $h_1$ represents a channel for the first user, $w_1$ represents a precoding vector for the first user, and $n_1$ represents Gaussian noise for the first user.

After a plurality of RSs included in an RS group are vectorized, the channel estimation of a received signal described as [Equation 10] may be given as [Equation 11].

$$\begin{bmatrix} \hat{h}_1^{(1)} \\ \hat{h}_1^{(3)} \\ \vdots \end{bmatrix} = \text{Cov}\left( \begin{bmatrix} \tilde{h}_1^{(1)} \\ \tilde{h}_1^{(3)} \\ \vdots \end{bmatrix}, \begin{bmatrix} \tilde{y}_1^{(1)} \\ \tilde{y}_1^{(3)} \\ \vdots \end{bmatrix} \right) \quad \text{[Equation 11]}$$

$$\text{Cov}\left( \begin{bmatrix} \tilde{y}_1^{(1)} \\ \tilde{y}_1^{(3)} \\ \vdots \end{bmatrix}, \begin{bmatrix} \tilde{y}_1^{(1)} \\ \tilde{y}_1^{(3)} \\ \vdots \end{bmatrix} \right)^{-1} \begin{bmatrix} \tilde{y}_1^{(1)} \\ \tilde{y}_1^{(3)} \\ \vdots \end{bmatrix}$$

$$= E\left\{ \begin{bmatrix} \tilde{h}_1^{(1)} \\ \tilde{h}_1^{(3)} \\ \vdots \end{bmatrix} \begin{bmatrix} \tilde{y}_1^{(1)} \\ \tilde{y}_1^{(3)} \\ \vdots \end{bmatrix}^H \right\} \left( E\left\{ \begin{bmatrix} \tilde{y}_1^{(1)} \\ \tilde{y}_1^{(3)} \\ \vdots \end{bmatrix} \begin{bmatrix} \tilde{y}_1^{(1)} \\ \tilde{y}_1^{(3)} \\ \vdots \end{bmatrix}^H \right\} \right)^{-1} \begin{bmatrix} \tilde{y}_1^{(1)} \\ \tilde{y}_1^{(3)} \\ \vdots \end{bmatrix}$$

$$= C_{\tilde{h},\tilde{h}} \left( C_{\tilde{h},\tilde{h}} + \frac{\sigma_n^2}{2\rho} I \right)^{-1} \begin{bmatrix} \tilde{y}_1^{(1)} \\ \tilde{y}_1^{(3)} \\ \vdots \end{bmatrix}$$

In [Equation 11], $\rho$ represents the power of the transmission signal, and $\sigma$ represents the power of a noise signal. Meanwhile, an $i^{th}$ virtual RS generated from a data signal may be expressed as [Equation 12].

$$z_1^{(i)} = \sqrt{\rho}\, g_1^{(i)} w_1 d_1^{(i)} + \sum_{j=2}^{N_t-1} \sqrt{\rho}\, g_1^{(i)} w_j d_j^{(i)} + v_1^{(i)} \quad \text{[Equation 12]}$$

In [Equation 12], $\rho$ represents the power of the transmission signal, $g_1$ represents a channel at a resource position related to a virtual RS for the first user, $d_1$ represents the data signal for the first user, $N_t$ represents the number of transmission antennas, j represents a user index, $W_1$ represents a precoding vector for the first user, and $v_1$ represents a noise signal at a position related to a virtual RS.

A virtual RS $z_1$ in [Equation 12] may be vectorized as [Equation 13].

$$\begin{bmatrix} z_1^{(1)} \\ z_1^{(2)} \\ z_1^{(3)} \\ \vdots \end{bmatrix} = \begin{bmatrix} d_1^{(1)} & 0 & 0 & \cdots \\ 0 & d_1^{(2)} & 0 & \cdots \\ 0 & 0 & d_1^{(3)} & \cdots \\ \vdots & \vdots & \vdots & \ddots \end{bmatrix} \begin{bmatrix} \sqrt{\rho}\, g_1^{(1)} w_1 \\ \sqrt{\rho}\, g_1^{(2)} w_1 \\ \sqrt{\rho}\, g_1^{(3)} w_1 \\ \vdots \end{bmatrix} +$$

$$\sum_{j=2}^{N_t-1} \begin{bmatrix} d_j^{(1)} & 0 & 0 & \cdots \\ 0 & d_j^{(2)} & 0 & \cdots \\ 0 & 0 & d_j^{(3)} & \cdots \\ \vdots & \vdots & \vdots & \ddots \end{bmatrix} \begin{bmatrix} \sqrt{\rho}\, g_1^{(1)} w_j \\ \sqrt{\rho}\, g_1^{(2)} w_j \\ \sqrt{\rho}\, g_1^{(3)} w_j \\ \vdots \end{bmatrix} + \begin{bmatrix} v_1^{(1)} \\ v_1^{(2)} \\ v_1^{(3)} \\ \vdots \end{bmatrix}$$

[Equation 13]

In [Equation 13], $d_1$ represents the data signal for the first user, $\rho$ represents the power of the transmission signal, $g_1$ represents the channel at the resource position related to the virtual RS of the first user, $w_1$ represents the precoding vector for the first user, j represents a user index, and $v_1$ represents the noise signal at the position related to the virtual RS.

Compared to an RS from which an orthogonal pattern is removed, the virtual RS of [Equation 13] still includes interference signals and data signals of other users, and thus is subjected to purification described as [Equation 14].

$$z = \sqrt{\rho}\, D_1 \tilde{g}_1 + \sqrt{\rho} \sum_{j=2}^{N_t-1} D_j \tilde{g}_j + v_j$$

$$\tilde{z} = \overline{D}_1^H \left( z - \sqrt{\rho} \sum_{j=2}^{N_t-1} \overline{D}_j \hat{g}_j \right)$$

$$= \sqrt{\rho}\, \overline{D}_1^H D_1 \tilde{g}_1 + \sqrt{\rho}\, \overline{D}_1^H \sum_{j=2}^{N_t-1}$$

$$(D_j(\tilde{g}_j - \hat{g}_j) + (D_j - \overline{D}_j)\hat{g}_j) + v_1$$

[Equation 14]

In [Equation 14], $\rho$ represents the power of the transmission signal, j represents a user index, $\overline{D}_j$ represents a signal for another user, for example, a $j^{th}$ user, detected by a multi-user detector, $\tilde{g}_j$ represents a valid channel $g_1 w_1$, $\hat{g}_j$ represents a channel value for another user, for example, the $j^{th}$ user, obtained during previous channel estimation, and $v_1$ represents a noise signal at the position related to the virtual RS.

Eventually, the RS and the virtual RS may be vectorized as [Equation 15].

$$\begin{bmatrix} \tilde{y}_1 \\ \tilde{z}_1 \end{bmatrix} = \begin{bmatrix} \frac{1}{2} P^H y \\ \overline{D}_1^H \left( z - \sqrt{\rho} \sum_{j=2}^{N_t-1} \overline{D}_j \hat{g}_j \right) \end{bmatrix} = \begin{bmatrix} \sqrt{\rho}\, \tilde{h}_1 \\ \sqrt{\rho}\, \overline{D}_1^H D_1 \tilde{g}_1 \end{bmatrix} +$$

[Equation 15]

-continued $$\sum_{j=2}^{N_t-1} \begin{bmatrix} 0 \\ \sqrt{\rho}\, \overline{D}_1^H D_j(\tilde{g}_j - \hat{g}_j) + \sqrt{\rho}\, \overline{D}_1^H (D_j - \overline{D}_j)\hat{g}_j \end{bmatrix} +$$

$$\begin{bmatrix} \frac{1}{2} P^H n_1 \\ \overline{D}_1^H v_1 \end{bmatrix}$$

In [Equation 15], $\rho$ represents the power of the transmission signal, j represents a user index, $\overline{D}_j$ represents a signal for another user, for example, a $j^{th}$ user, detected by the multi-user detector, $\tilde{g}_j$ represents the valid channel $g_1 w_1$, $\hat{g}_j$ represents a channel value for another user, for example, the $j^{th}$ user, obtained during previous channel estimation, and $v_1$ represents a noise signal at the position related to the virtual RS.

Channel estimation based on the virtual RS based on the rectified received signal may be expressed as [Equation 16].

$$\begin{bmatrix} \sqrt{\rho}\, \hat{h}_1 \\ \sqrt{\rho}\, \hat{g}_1 \end{bmatrix} = \text{Cov}\left( \begin{bmatrix} \sqrt{\rho}\, h_1 \\ \sqrt{\rho}\, g_1 \end{bmatrix}, \begin{bmatrix} \tilde{y}_1 \\ \tilde{z}_1 \end{bmatrix} \right)$$

$$\text{Cov}\left( \begin{bmatrix} \tilde{y}_1 \\ \tilde{z}_1 \end{bmatrix}, \begin{bmatrix} \tilde{y}_1 \\ \tilde{z}_1 \end{bmatrix}, \begin{bmatrix} \tilde{y}_1 \\ \tilde{z}_1 \end{bmatrix} \right)^{-1} \begin{bmatrix} \tilde{y}_1 \\ \tilde{z}_1 \end{bmatrix}$$

$$= \begin{bmatrix} \rho C_{\tilde{h},\tilde{h}} & \rho C_{\tilde{h},\tilde{g}} \Lambda_1 \\ \rho C_{\tilde{g},\tilde{h}} & \rho C_{\tilde{g},\tilde{g}} \Lambda_1 \end{bmatrix}$$

$$\begin{bmatrix} \rho C_{\tilde{h},\tilde{h}} + \frac{\sigma_n^2}{2} I & \rho C_{\tilde{h},\tilde{g}} \Lambda_1 \\ \rho \Lambda_1^H C_{\tilde{g},\tilde{h}} & \Omega \end{bmatrix}^{-1} \begin{bmatrix} \tilde{y}_1 \\ \tilde{z}_1 \end{bmatrix}$$

[Equation 16]

In [Equation 16], $$\Omega = \rho \Lambda_1^2 \otimes C_{\tilde{g},\tilde{g}} + \rho \sum_{j=2}^{N_t-1} \Lambda_1 \otimes \Lambda_j \otimes C_{e,e} +$$

$$\rho \sum_{j=2}^{N_t-1} \Lambda_1 \otimes (\Lambda_f - \overline{d}_j \overline{d}_j^H) \otimes C_{\tilde{g},\tilde{g}} + \frac{\sigma_v^2}{\rho} \Lambda_1,$$

$\Lambda_1 = \text{diag}([E[(d_1^{(1)})^2], E[(d_1^{(2)})^2], E[(d_1^{(3)})^2], \ldots ])$,
$C_{e,e} = \text{Cov}((\tilde{g}_j - \hat{g}_j), (\tilde{g}_j - \hat{g}_j))$, and $\overline{d}_j = [E[d_j^{(1)}]^T, E[d_j^{(2)}]^T, E[d_j^{(3)}]^T, \ldots ]^T$.

In order to achieve performance improvement with a virtual RS, although the accuracy of data recovered based on the virtual RS is important, the virtual RS should be closely correlated with an original RS. Further, due to the existence of interference from other users, the virtual RS should be a signal at a resource position at which the interference from other users is canceled relatively well. Accordingly, a virtual RS should be selected based on a signal having a smallest average error on a channel estimated as follows, in order to maximize the effect of channel estimation using the virtual RS.

A resource position having the smallest error value on the estimated channel may be determined by [Equation 17].

$$\phi(n) = E\left\| \begin{bmatrix} \sqrt{\rho}\, h_1 \\ \sqrt{\rho}\, g_1 \end{bmatrix} - \begin{bmatrix} \sqrt{\rho}\, \hat{h}_1 \\ \sqrt{\rho}\, \hat{g}_1 \end{bmatrix} \right\|^2$$

[Equation 17]

-continued $$= tr\left(\text{Cov}\left(\begin{bmatrix}\sqrt{\rho}h_1\\\sqrt{\rho}g_1\end{bmatrix}, \begin{bmatrix}\sqrt{\rho}h_1\\\sqrt{\rho}g_1\end{bmatrix}\right) - \text{Cov}\left(\begin{bmatrix}\sqrt{\rho}h_1\\\sqrt{\rho}g_1\end{bmatrix}, \begin{bmatrix}\tilde{y}_1\\\tilde{z}_1\end{bmatrix}\right)\right.$$

$$\left.\text{Cov}\left(\begin{bmatrix}\tilde{y}_1\\\tilde{z}_1\end{bmatrix}, \begin{bmatrix}\tilde{y}_1\\\tilde{z}_1\end{bmatrix}\right)^{-1} \text{Cov}\left(\begin{bmatrix}\sqrt{\rho}h_1\\\sqrt{\rho}g_1\end{bmatrix}, \begin{bmatrix}\tilde{y}_1\\\tilde{z}_1\end{bmatrix}\right)\right)$$

In [Equation 17], $\rho$ represents the power of the transmission signal, $h_1$ represents the channel for the first user, and $g_1$ represents the channel at the position related to the virtual RS for the first user.

After a series of computations, it may be noted that the resource position having the smallest error value, described as [Equation 17] is identical to a resource position having a large value calculated by [Equation 18].

$$\bar{\phi}(n) = \frac{1}{1 - \frac{|d_1^{(n)}|^2 \lambda_1^{(n)}}{\rho \sum_{i=1}^{N_t} \lambda_i^{(n)}}} + \frac{1}{1 - \|C_{\tilde{h},\tilde{g}}\|^2} \quad \text{[Equation 18]}$$

In [Equation 18], $\rho$ represents the power of the transmission signal, i represents a user index, $d_1$ represents the data signal for the first user, and $\lambda_i$ represents $E[(d_i)^2]$ of the $i^{th}$ user. In addition, the first term represents the accuracy of recovered data at a related resource position, and the second term represents the correlation between the related resource position and the resource position of the RS in [Equation 18]. The correlation may indicate how close the related resource is to the resource of the RS on the frequency or time axis. In addition, $C_{\tilde{h},\tilde{g}}$ has a value between 0 and 1, and as $C_{\tilde{h},\tilde{g}}$ is closer to 1, the correlation is higher.

FIG. 6 and [Equation 8] to [Equation 18] have been described in the context of a demodulation RS in an LTE system, by way of example. However, it is obvious that the embodiment illustrated in FIG. 6 and [Equation 8] to [Equation 18] are also applicable to an RS having a different structure as well as the demodulation RS. Apparently, the embodiment illustrated in FIG. 6 may be implemented irrespective of an antenna configuration, the number of users in a related system, and a principle of generating an RS group based on antennas.

Figure 7:
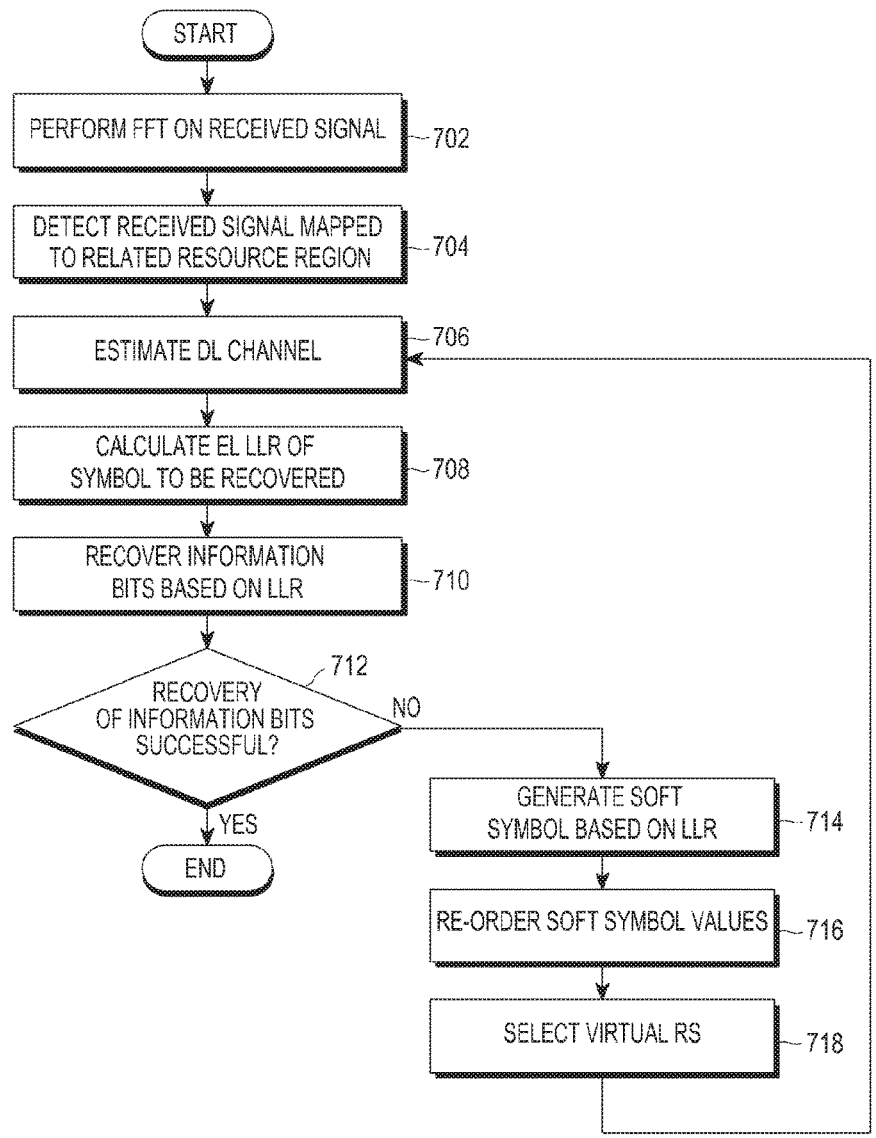
FIG. 7 is a flowchart illustrating an operation of a receiver for estimating a DL channel in the MU-MIMO system according to an embodiment of the present disclosure.

FIG. 7 is a flowchart illustrating an operation of a receiver for estimating a DL channel in the MU-MIMO system according to an embodiment of the present disclosure.

Referring to FIG. 7, the receiver receives a signal and performs FFT on the received signal in operation 702. In operation 704, the receiver detects a received signal mapped to a related resource region from the received FFT signal. Herein, the received signal mapped to the related resource region is assumed to be an RS.

In operation 706, the receiver estimates a DL channel based on the detected RS. The receiver then calculates the LLR of a symbol to be recovered from the detected RS in operation 708.

The receiver recovers information bits by performing channel decoding based on the LLR in operation 710 and checks whether the information bits have been recovered successfully in operation 712. For the channel decoding, a decoding scheme corresponding to an encoding scheme used in an encoder is used. Herein, it is assumed that turbo decoding is used, by way of example. Various error detection schemes are available for the check operation in operation 712. Herein, it is assumed that a cyclic redundancy check (CRC) scheme is used, by way of example.

If it turns out that the receiver has succeeded in recovering the information bits in the check in operation 712, the receiver ends the channel estimation operation. If it turns out that the receiver has not succeeded in recovering the information bits, the receiver generates soft symbols based on LLRs in operation 714. The receiver re-orders the soft symbol values in operation 716, and selects a virtual RS in operation 718. Herein, the virtual RS is selected based on the accuracy of data recovered at a related resource position, and the correlation between the related resource position and the position of a resource in which an RS is received, and a signal received at a resource position having a high accuracy of recovered data and a high correlation is selected as a virtual RS.

Subsequently, the receiver proceeds to operation 706, and re-estimates the DL channel based on the virtual RS selected in operation 718.

While channel estimation is repeated until information bits are successfully recovered in FIG. 7, by way of example, the receiver may predetermine a decoding repetition number. In this case, the receiver may perform channel estimation as many times as the predetermined decoding repetition number, and ends the channel estimation irrespective of whether information bits are successfully recovered.

Figure 8:
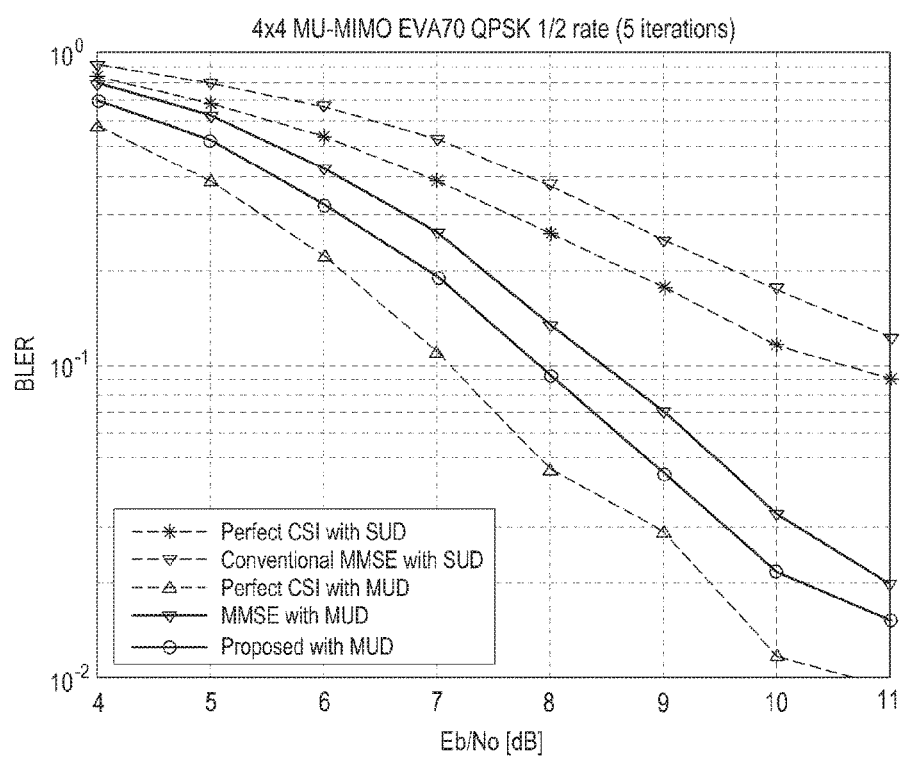
FIG. 8 is a graph illustrating the performance of a receiver using a single-user detection scheme and the performance of a receiver using a multi-user detection scheme in the MU-MIMO system according to an embodiment of the present disclosure.

FIG. 8 is a graph illustrating the performance of a receiver using a single-user detection scheme and the performance of a receiver using a multi-user detection scheme in the MU-MIMO system according to an embodiment of the present disclosure.

Referring to FIG. 8, it is assumed that the MU-MIMO system includes an eNB having four antennas and four users, and the four antennas are grouped into two groups each including two antennas. It is also assumed that the four users are allocated to four resources and receive RSs in the allocated resources.

An extended vehicular A (EVA) model is used as a channel environment and the Doppler effect is assumed to be 70 hz. It is assumed that minimum mean square error-partial interference cancellation (MMSE-PIC) is used as an LLC calculation scheme, and 32 symbols are selected per resource block in the case of a virtual RS. Further, it is assumed that quadrature phase shift keying ½ (QPSK ½) is used as a modulation scheme and the sum of interference power amounts to −2 dB with respect to a predetermined user power.

In the illustrated graph, the horizontal axis represents energy per bit to noise spectral density ratio (Eb/No), and the vertical axis represents block error rate (BER).

Further, Perfect channel state information (CSI) with single user detection (SUD) is a graph illustrating the performance of a receiver using SUD, Conventional MMSE with SUD is a graph illustrating the performance of a receiver using legacy MMSE and SUD, Perfect CSI with multi-user detection (MUD) is a graph illustrating the performance of a receiver having knowledge of accurate channel information and using MUD, MMSE with MUD is a graph illustrating the performance of a receiver that estimates an interference channel by MMSE and uses MUD, and Proposed with MUD is a graph illustrating the performance of a receiver using a virtual RS.

It may be noted from the graph illustrated in FIG. 8 that the receiver using a virtual RS has a performance increase of 4 dB with respect to the performance of the SUD receiver and a performance increase of 0.5 dB with respect to the performance of the MUD receiver.

Figure 9:
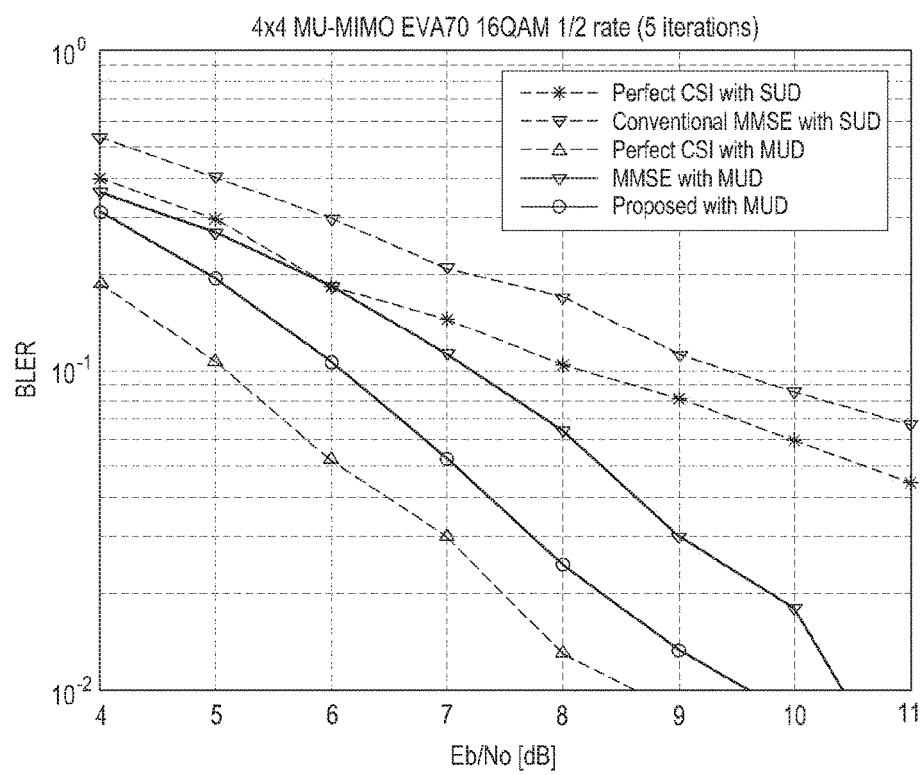
FIG. 9 is another graph illustrating the performance of a receiver using a single-user detection scheme and the performance of a receiver using a multi-user detection scheme in an MU-MIMO system according to an embodiment of the present disclosure.

FIG. 9 is another graph illustrating the performance of a receiver using SUD and the performance of a receiver using MUD in the MU-MIMO system according to an embodiment of the present disclosure.

Referring to FIG. 9, it is assumed that the MU-MIMO system includes an eNB having four antennas and four users, and the four antennas are grouped into two groups each including two antennas. It is also assumed that the four users are allocated to four resources and receive RSs in the allocated resources.

An EVA model is used as a channel environment and the Doppler effect is assumed to be 70 hz. It is assumed that MMSE-PIC is used as an LLC calculation scheme, and 32 symbols ae selected per resource block in the case of a virtual RS. Further, it is assumed that 16QAM is used as a modulation scheme and the sum of interference power amounts to −3 dB with respect to a predetermined user power.

In the illustrated graph, the horizontal axis represents Eb/No, and the vertical axis represents BER.

Further, Perfect CSI with SUD is a graph illustrating the performance of a receiver which has knowledge of accurate channel information and uses SUD. Conventional MMSE with SUD is a graph illustrating the performance of a receiver using legacy MMSE and SUD, Perfect CSI with MUD is a graph illustrating the performance of a receiver having knowledge of accurate channel information and using MUD, MMSE with MUD is a graph illustrating the performance of a receiver that estimates an interference channel by MMSE and uses MUD, and Proposed with MUD is a graph illustrating the performance of a receiver using a virtual RS.

It may be noted from the graph illustrated in FIG. 9 that the receiver using a virtual RS has a performance increase of 3 dB with respect to the performance of the SUD receiver and a performance increase of 1 dB with respect to the performance of the MUD receiver.

While the disclosure has been shown and described with reference to specific embodiments thereof, it will be understood by those skilled in the art that various changes in form and details may be made therein without departing from the spirit and scope of the disclosure as defined by the appended claims and their equivalents.

Further, the apparatus and method for estimating a downlink channel according to the embodiments of the present disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as CD, DVD, a magnetic disk, or a magnetic tape. The estimating a downlink channel method according to the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the present disclosure appropriately includes the equivalents.

In addition, the apparatus according to embodiments of the present disclosure may receive and store a program from the downlink channel estimation apparatus. The program providing device may include a program containing instructions that control a program processor to perform a predetermined content protection method, a memory for storing information required for the content protection method, a communication unit for conducting wired or wireless communication with a processor, and a controller for transmitting the program to a transceiver upon request of the processor or automatically.

The invention claimed is:

1. A method for estimating a downlink channel by a receiver in a wireless communication system, the method comprising:

removing an orthogonal pattern from a reference signal among received signals;

recovering information bits by estimating a downlink channel based on the reference signal from which the orthogonal pattern is removed;

in response that the recovery of information bits is failed, selecting a virtual reference signal based on at least one of accuracy of data recovered at a position of a resource carrying each of the received signals, a correlation between the position of the resource carrying each of the received signals and a position of a resource carrying the reference signal, and an average error of a channel estimated at the position of the resource carrying each of the received signals; and estimating the downlink channel based on the selected virtual reference signal.

2. The method of claim 1, wherein the selecting of the virtual reference signal comprises selecting a signal having a highest accuracy of recovered data and a highest correlation from among the received signals.

3. The method of claim 2, wherein the position of the resource carrying the signal having the highest accuracy of recovered data and the highest correlation is determined by the following equation, $$\bar{\phi}(n) = \frac{1}{1 - \frac{|\bar{d}_1^{(n)}|^2 \lambda_1^{(n)}}{\rho \sum_{i=1}^{N_i} \lambda_i^{(n)}}} + \frac{1}{1 - \|C_{\tilde{h},\tilde{g}}\|^2}$$

where the first term on the right side of the equation represents the accuracy of recovered data, the second term represents the correlation, $\rho$ represents power of a transmission signal, i represents a user terminal index, $d_1$ represents a data signal for a first user terminal, and $\lambda_i$ represents $E\lfloor (d_i)^2 \rfloor$ of an $i^{th}$ user terminal.

4. The method of claim 1, wherein the selection of the virtual reference signal comprises selecting a signal having a smallest average error of the estimated channel.

5. The method of claim 4, wherein a position of a resource carrying the signal having the smallest average error of the estimated channel is determined by the following equation, $$\phi(n) = E\left\| \begin{bmatrix} \sqrt{\rho} h_1 \\ \sqrt{\rho} g_1 \end{bmatrix} - \begin{bmatrix} \sqrt{\rho} \hat{h}_1 \\ \sqrt{\rho} \hat{g}_1 \end{bmatrix} \right\|^2$$

-continued $$= tr\left(Cov\left(\begin{bmatrix}\sqrt{\rho}\,h_1\\\sqrt{\rho}\,g_1\end{bmatrix},\begin{bmatrix}\sqrt{\rho}\,h_1\\\sqrt{\rho}\,g_1\end{bmatrix}\right) - Cov\left(\begin{bmatrix}\sqrt{\rho}\,h_1\\\sqrt{\rho}\,g_1\end{bmatrix},\begin{bmatrix}\tilde{y}_1\\\tilde{z}_1\end{bmatrix}\right)\right.$$
$$\left.Cov\left(\begin{bmatrix}\tilde{y}_1\\\tilde{z}_1\end{bmatrix},\begin{bmatrix}\tilde{y}_1\\\tilde{z}_1\end{bmatrix}\right)^{-1}Cov\left(\begin{bmatrix}\sqrt{\rho}\,h_1\\\sqrt{\rho}\,g_1\end{bmatrix},\begin{bmatrix}\tilde{y}_1\\\tilde{z}_1\end{bmatrix}\right)\right)$$

where $\rho$ represents power of a transmission signal, $h_1$ represents a channel for a first user terminal, and $g_1$ represents a channel at a resource position related to a virtual reference signal for the first user terminal.

6. The method of claim 1,
wherein the reference signal $\tilde{y}_t^{(1)}$ free of the orthogonal pattern is represented as the following equation, $$\tilde{y}_1^{(1)} = \frac{1}{2}[p_1^*\ p_2^*]\begin{bmatrix}y_1^{(1)}\\y_1^{(2)}\end{bmatrix} = \sqrt{\rho}\,h_1^{(1)}w_1 + \frac{1}{2}p_1^*n_1^{(1)} + \frac{1}{2}p_2^*n_1^{(2)}$$

where $p_1$ represents a reference signal allocated to a first resource, $p_2$ represents a reference signal allocated to a second resource, $y_1$ represents a received signal of a first user terminal, $\rho$ represents power of a transmission signal, $h_1$ represents a channel for the first user terminal, $w_1$ represents a precoding vector for the first user terminal, and $n_1$ represents Gaussian noise for the first user terminal.

7. The method of claim 1, further comprising removing an interference signal and a data signal of another user terminal from the virtual reference signal,
wherein the virtual reference signal $\tilde{z}$ free of the interference signal and the data signal of the another user terminal is represented as the following equation, $$\tilde{z} = \overline{D}_1^H\left(z - \sqrt{\rho}\sum_{j=2}^{N_t-1}\overline{D}_j\hat{g}_j\right)$$
$$= \sqrt{\rho}\,\overline{D}_1^H D_1\tilde{g}_1 + \sqrt{\rho}\,\overline{D}_1^H\sum_{j=2}^{N_t-1}(D_j(\tilde{g}_j-\hat{g}_j) + (D_j - \overline{D}_j\hat{g}_j) + v_1$$

where $\rho$ represents power of a transmission signal, j represents a user terminal index, $\overline{D}_j$ represents a signal for another user terminal, for example, a $j^{th}$ user terminal, detected by a multi-user detector, g represents a valid channel $g_1w_1$, $\hat{g}_j$ represents a channel value for another user terminal, for example, the $j^{th}$ user terminal, obtained during previous channel estimation, and $v_1$ represents a noise signal at a position related to the virtual reference signal.

8. An apparatus for estimating a downlink channel in a wireless communication system, the apparatus comprising:
a receiver configured to receive signals; and
a processor coupled with the receiver and configured to:
remove an orthogonal pattern from a reference signal among the received signals,
recover information bits by estimating a downlink channel based on the reference signal from which the orthogonal pattern is removed,
in response that the recovery of information bits is failed, select a virtual reference signal based on at least one of accuracy of data recovered at a position of a resource carrying each of the received signals, a correlation between the position of the resource carrying each of the received signals and a position of a resource carrying the reference signal, and an average error of a channel estimated at the position of the resource carrying each of the received signals, and
estimate the downlink channel based on the selected virtual reference signal.

9. The apparatus of claim 8, wherein the processor is further configured to select a signal having a highest accuracy of recovered data and a highest correlation from among the received signals.

10. The apparatus of claim 9, wherein a position of a resource carrying the signal having the highest accuracy of recovered data and the highest correlation is determined by the following equation, $$\overline{\phi}(n) = \frac{1}{1 - \frac{|\overline{d}_1^{(n)}|^2\lambda_1^{(n)}}{\rho\sum_{i=1}^{N_t}\lambda_i^{(n)}}} + \frac{1}{1 - \|C_{\tilde{h},\tilde{g}}\|^2}$$

where the first term on the right side of the equation represents the accuracy of recovered data, the second term represents the correlation, $\rho$ represents power of a transmission signal, i represents a user terminal index, $d_1$ represents a data signal for a first user terminal, and $\lambda_i$ represents $E\lfloor(d_i)^2\rfloor$ of an $i^{th}$ user terminal.

11. The apparatus of claim 8, wherein the processor is further configured to select a signal having a smallest average error of the estimated channel.

12. The apparatus of claim 11, wherein a position of a resource carrying the signal having the smallest average error of the estimated channel is determined by the following equation, $$\phi(n) = E\left\|\begin{bmatrix}\sqrt{\rho}\,h_1\\\sqrt{\rho}\,g_1\end{bmatrix} - \begin{bmatrix}\sqrt{\rho}\,\hat{h}_1\\\sqrt{\rho}\,\hat{g}_1\end{bmatrix}\right\|^2$$
$$= tr\left(Cov\left(\begin{bmatrix}\sqrt{\rho}\,h_1\\\sqrt{\rho}\,g_1\end{bmatrix},\begin{bmatrix}\sqrt{\rho}\,h_1\\\sqrt{\rho}\,g_1\end{bmatrix}\right) - Cov\left(\begin{bmatrix}\sqrt{\rho}\,h_1\\\sqrt{\rho}\,g_1\end{bmatrix},\begin{bmatrix}\tilde{y}_1\\\tilde{z}_1\end{bmatrix}\right)\right.$$
$$\left.Cov\left(\begin{bmatrix}\tilde{y}_1\\\tilde{z}_1\end{bmatrix},\begin{bmatrix}\tilde{y}_1\\\tilde{z}_1\end{bmatrix}\right)^{-1}Cov\left(\begin{bmatrix}\sqrt{\rho}\,h_1\\\sqrt{\rho}\,g_1\end{bmatrix},\begin{bmatrix}\tilde{y}_1\\\tilde{z}_1\end{bmatrix}\right)\right)$$

where $\rho$ represents power of a transmission signal, $h_1$ represents a channel for a first user terminal, and $g_1$ represents a channel at a resource position related to a virtual reference signal for the first user terminal.

13. The apparatus of claim 8, wherein the reference signal $\tilde{y}_1^{(1)}$ free of the orthogonal pattern is represented as the following equation, $$\tilde{y}_1^{(1)} = \frac{1}{2}[p_1^*\ p_2^*]\begin{bmatrix}y_1^{(1)}\\y_1^{(2)}\end{bmatrix} = \sqrt{\rho}\,h_1^{(1)}w_1 + \frac{1}{2}p_1^*n_1^{(1)} + \frac{1}{2}p_2^*n_1^{(2)}$$

where $p_1$ represents a reference signal allocated to a first resource, $p_2$ represents a reference signal allocated to a second resource, $y_1$ represents a received signal of a first user terminal, $\rho$ represents power of a transmission signal, $h_1$ represents a channel for the first user terminal, $w_1$ represents a precoding vector for the first user terminal, and $n_1$ represents Gaussian noise for the first user terminal.

14. The apparatus of claim 8, wherein the processor is further configured to remove an interference signal and a data signal of another user terminal from the virtual reference signal, and the virtual reference signal $\tilde{z}$ free of the interference signal and the data signal of the another user terminal is represented as the following equation, $$\tilde{z} = \overline{D}_1^H \left( z - \sqrt{\rho} \sum_{j=2}^{N_t-1} \overline{D}_j \hat{g}_j \right)$$

$$= \sqrt{\rho} \overline{D}_1^H D_1 \tilde{g}_1 + \sqrt{\rho} \overline{D}_1^H \sum_{j=2}^{N_t-1} (D_j(\tilde{g}_j - \hat{g}_j) + (D_j - \overline{D}_j)\hat{g}_j) + v_1$$

where $\rho$ represents power of a transmission signal, $j$ represents a user terminal index, $\overline{D}_j$ represents a signal for another user terminal, for example, a $j^{th}$ user terminal, detected by a multi-user detector, $\tilde{g}_j$ represents a valid channel $g_1 w_1$, $\hat{g}_j$ represents a channel value for another user terminal, for example, the $j^{th}$ user terminal, obtained during previous channel estimation, and $v_1$ represents a noise signal at a position related to the virtual reference signal.

* * * * *